No. 792,267. PATENTED JUNE 13, 1905.
M. G. IMBACH.
MACHINE FOR MAKING BRUSH KNOTS.
APPLICATION FILED JUNE 14, 1904.
9 SHEETS—SHEET 1.
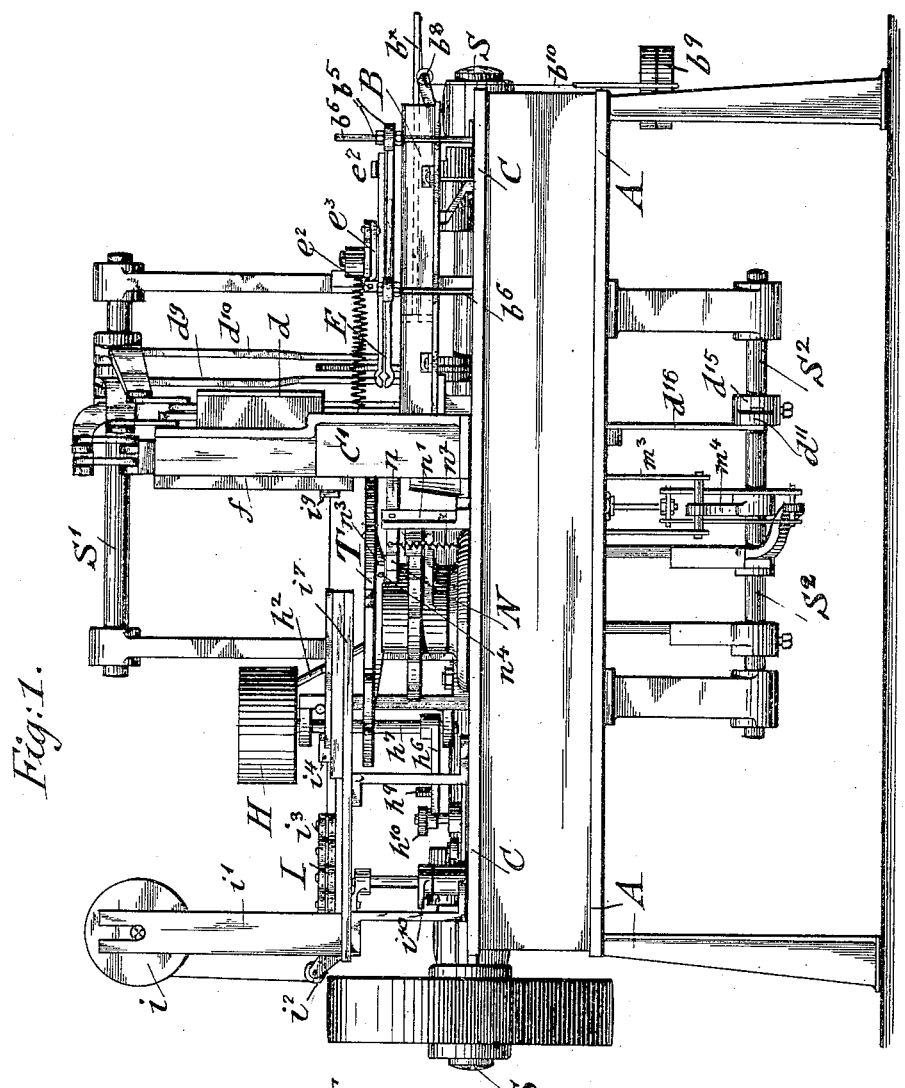
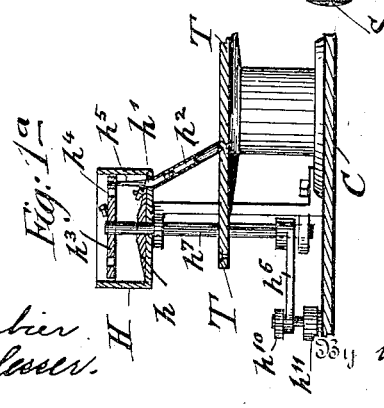
Witnesses
Henry J. Sulsbier
J. Henry Glaser.
Inventor
Martin G. Imbach
By his Attorneys
Bruer Niles No. 792,267. PATENTED JUNE 13, 1905.
M. G. IMBACH.
MACHINE FOR MAKING BRUSH KNOTS.
APPLICATION FILED JUNE 14, 1904.
9 SHEETS—SHEET 2.
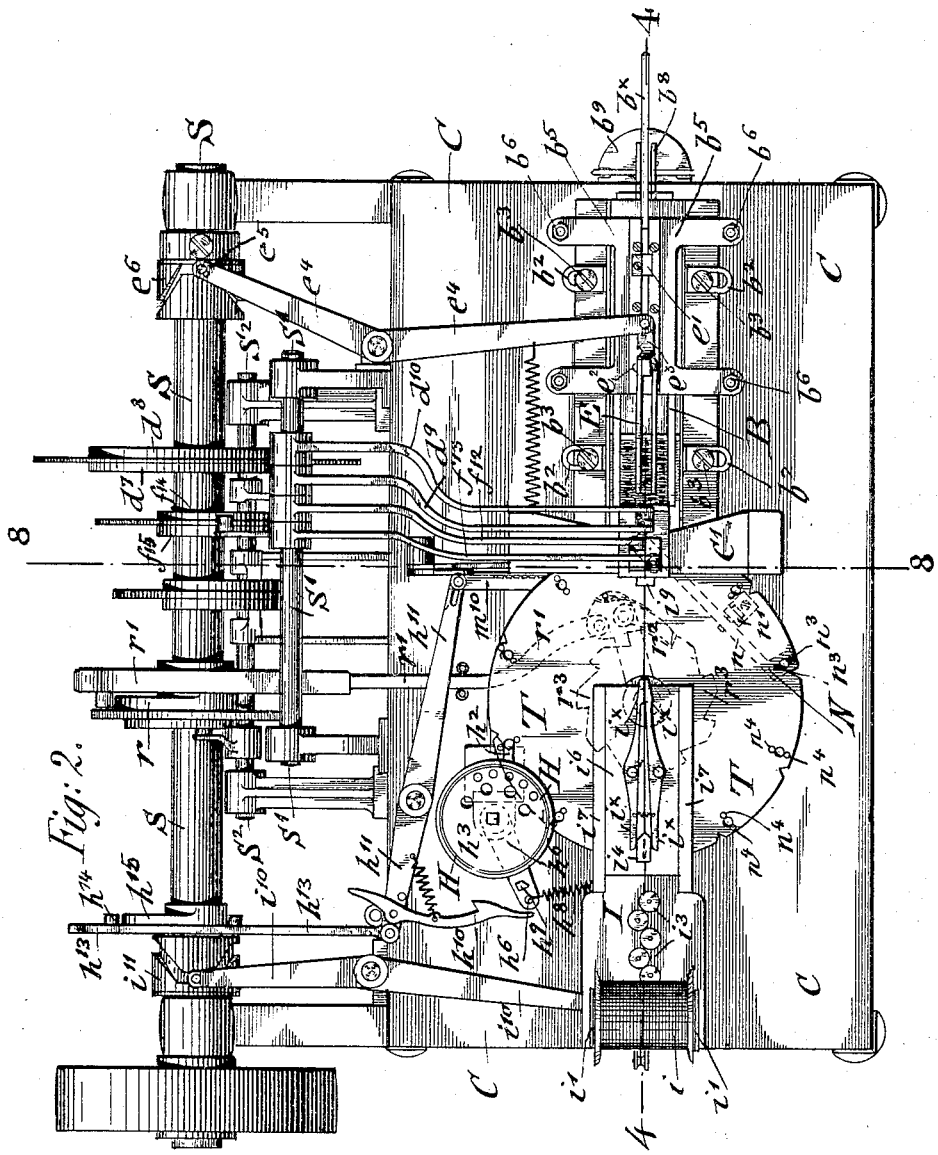

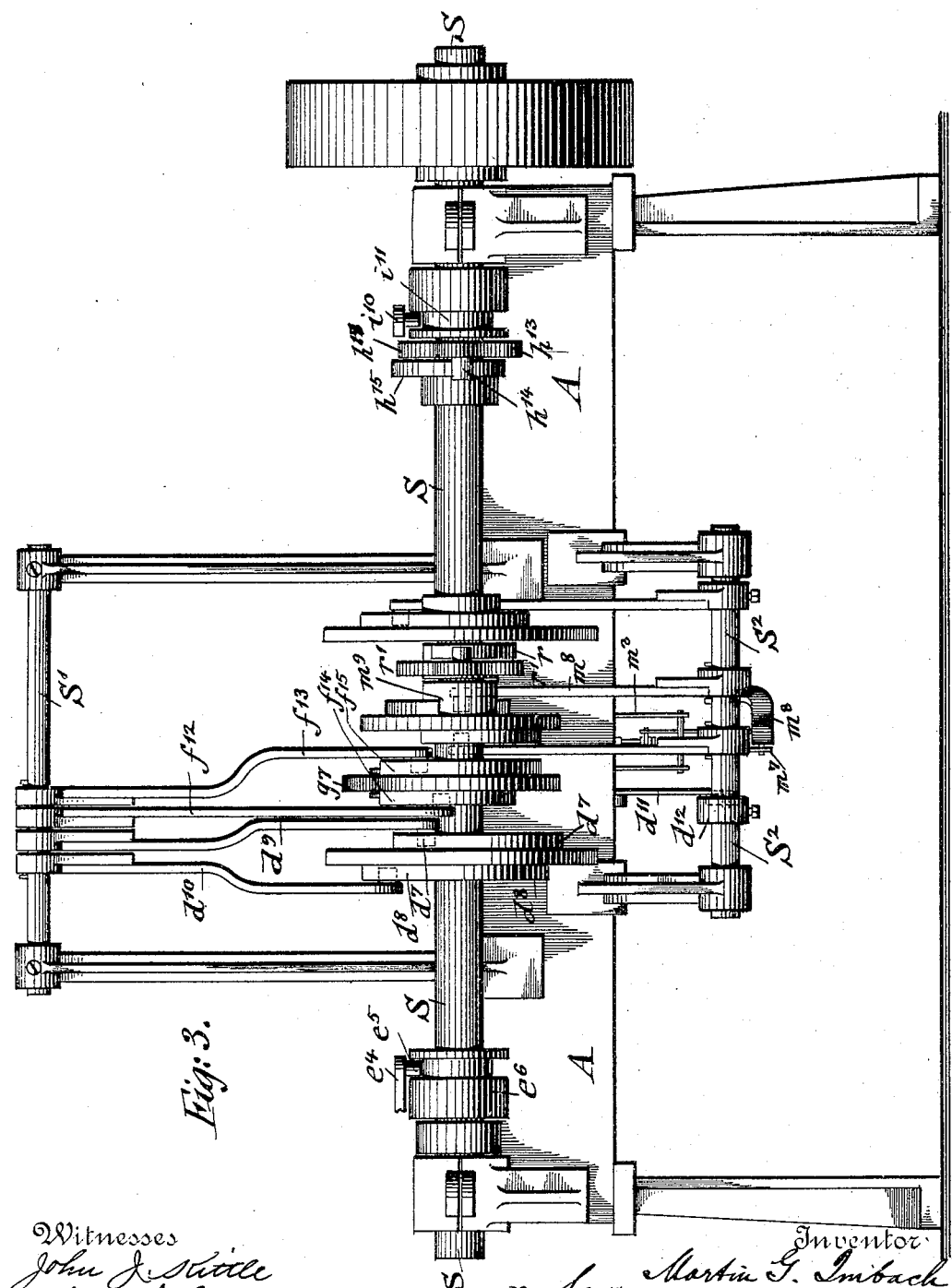

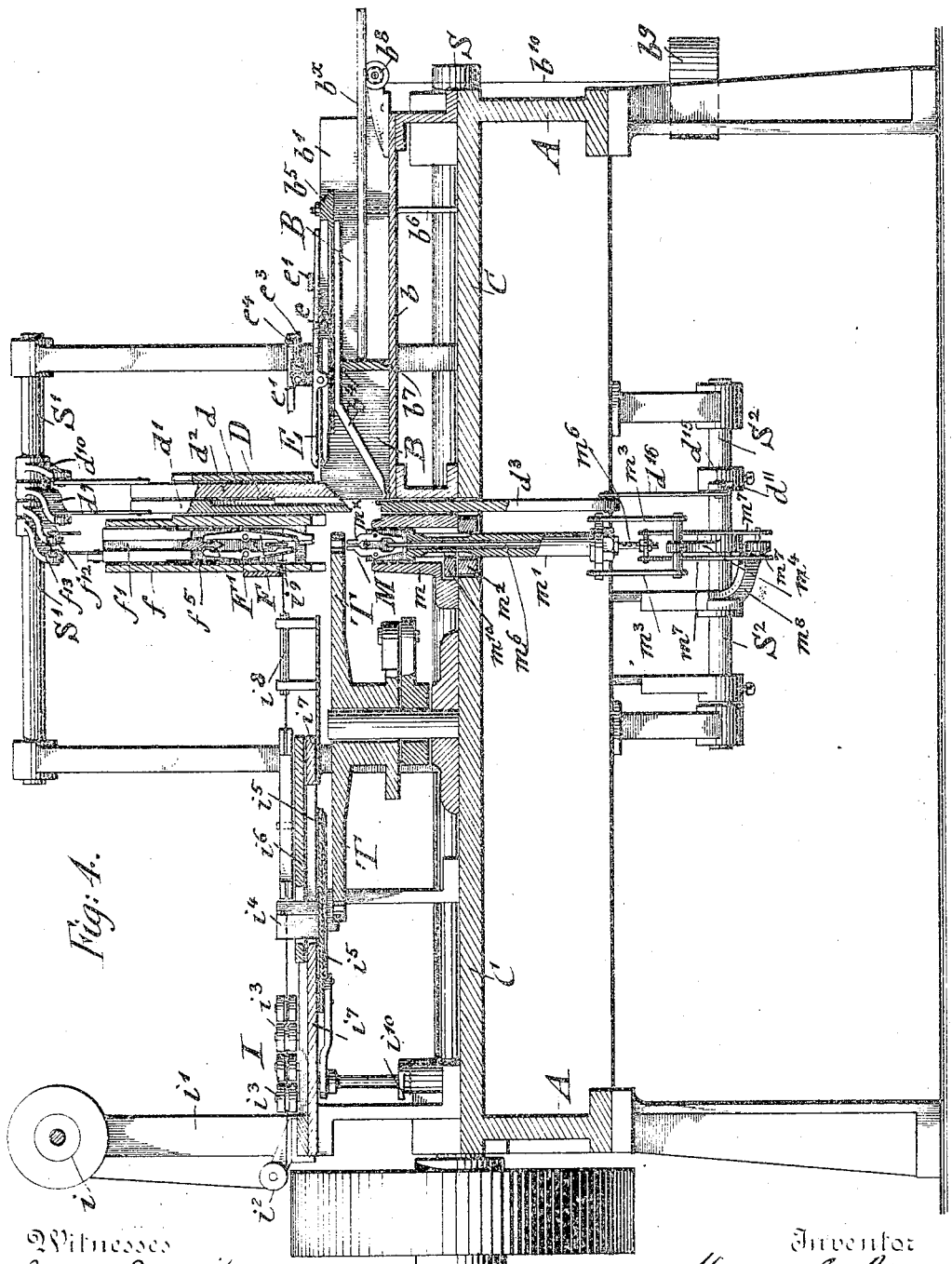

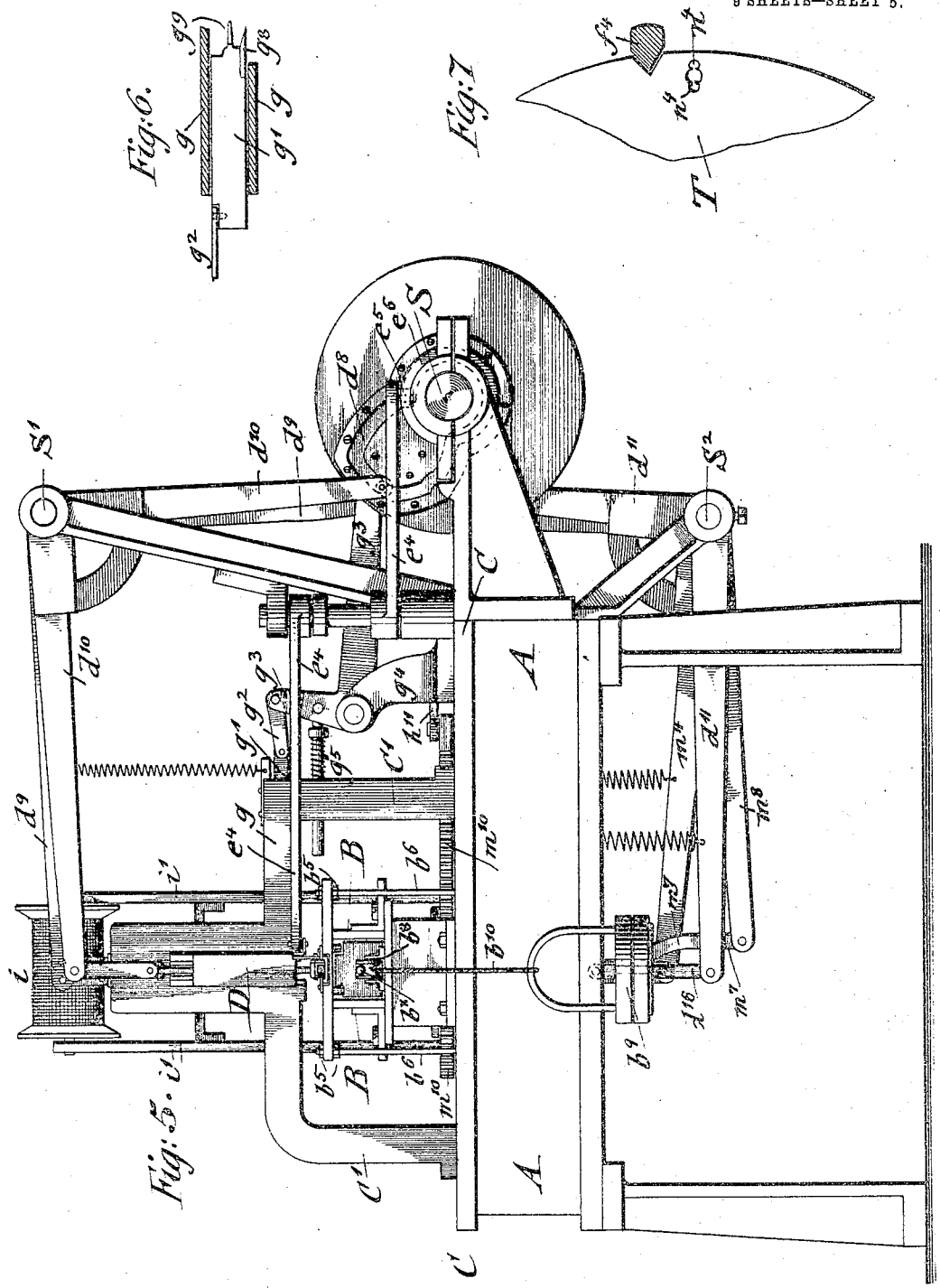

No. 792,267. PATENTED JUNE 13, 1905.
M. G. IMBACH.
MACHINE FOR MAKING BRUSH KNOTS.
APPLICATION FILED JUNE 14, 1904.
9 SHEETS—SHEET 6.
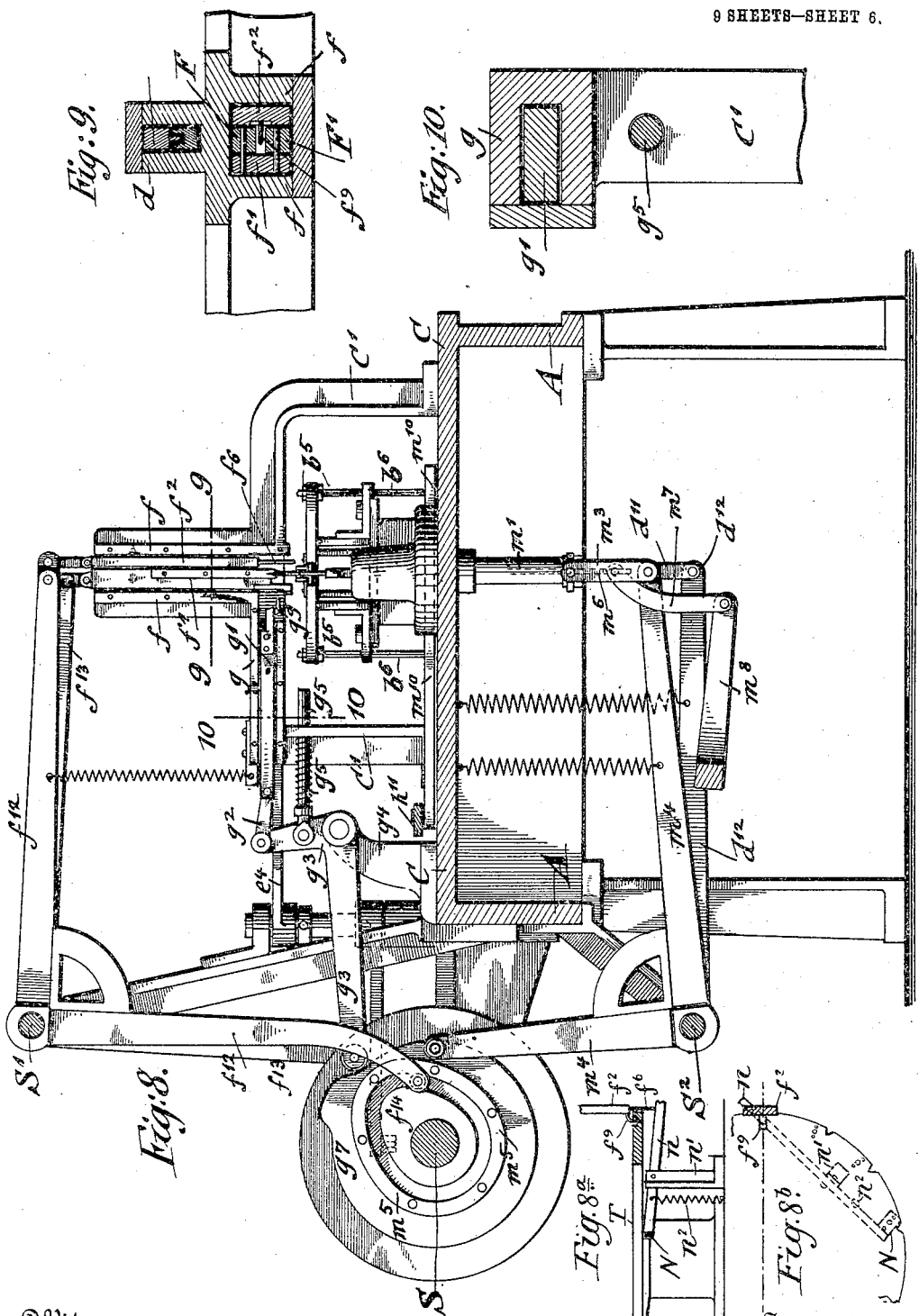
Witnesses
John J. Kittle
Henry J. Suhrbier
Inventor
Martin G. Imbach
By his Attorneys
Foemer Niles No. 792,267. PATENTED JUNE 13, 1905.
M. G. IMBACH.
MACHINE FOR MAKING BRUSH KNOTS.
APPLICATION FILED JUNE 14, 1904.
9 SHEETS—SHEET 7.
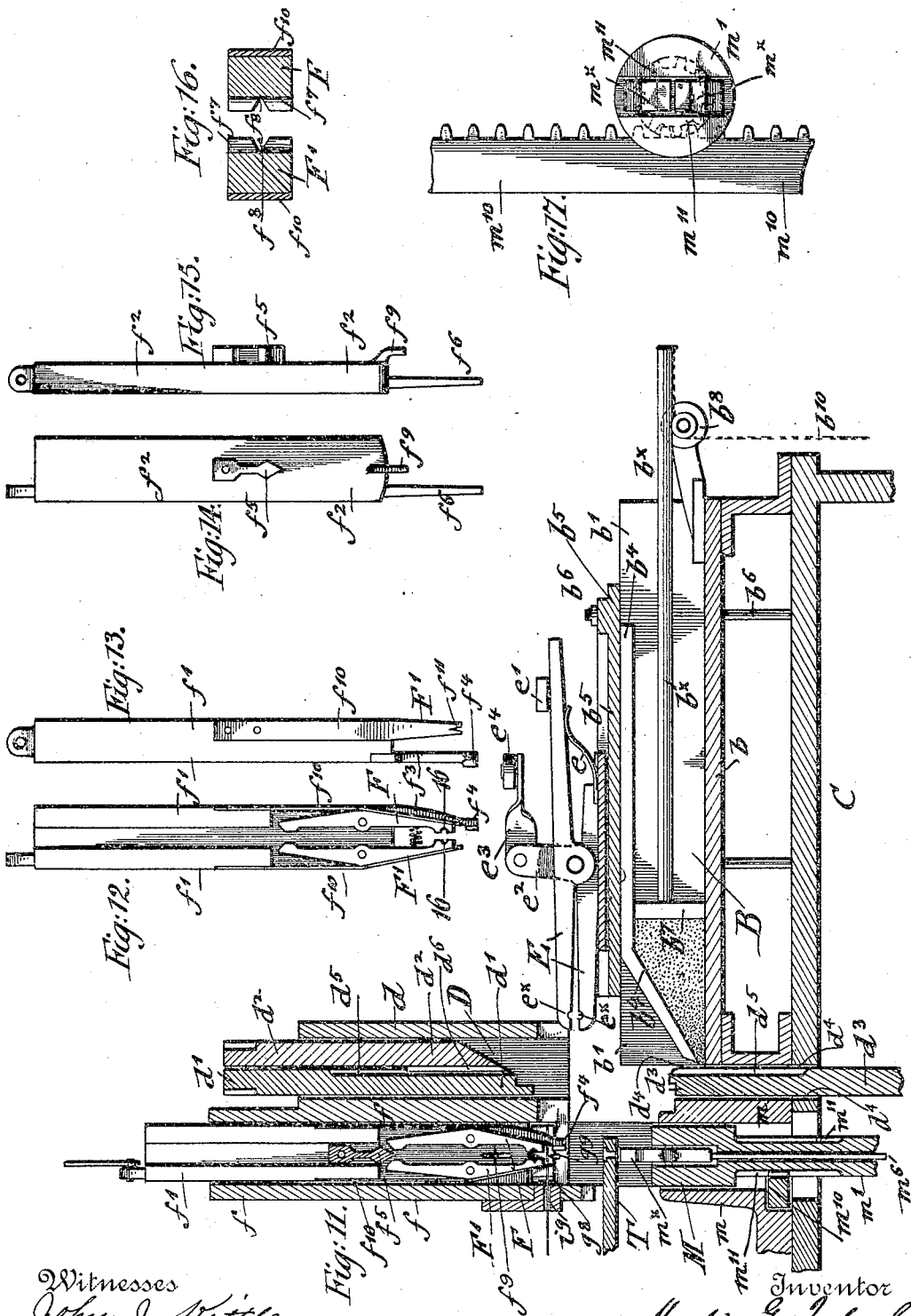

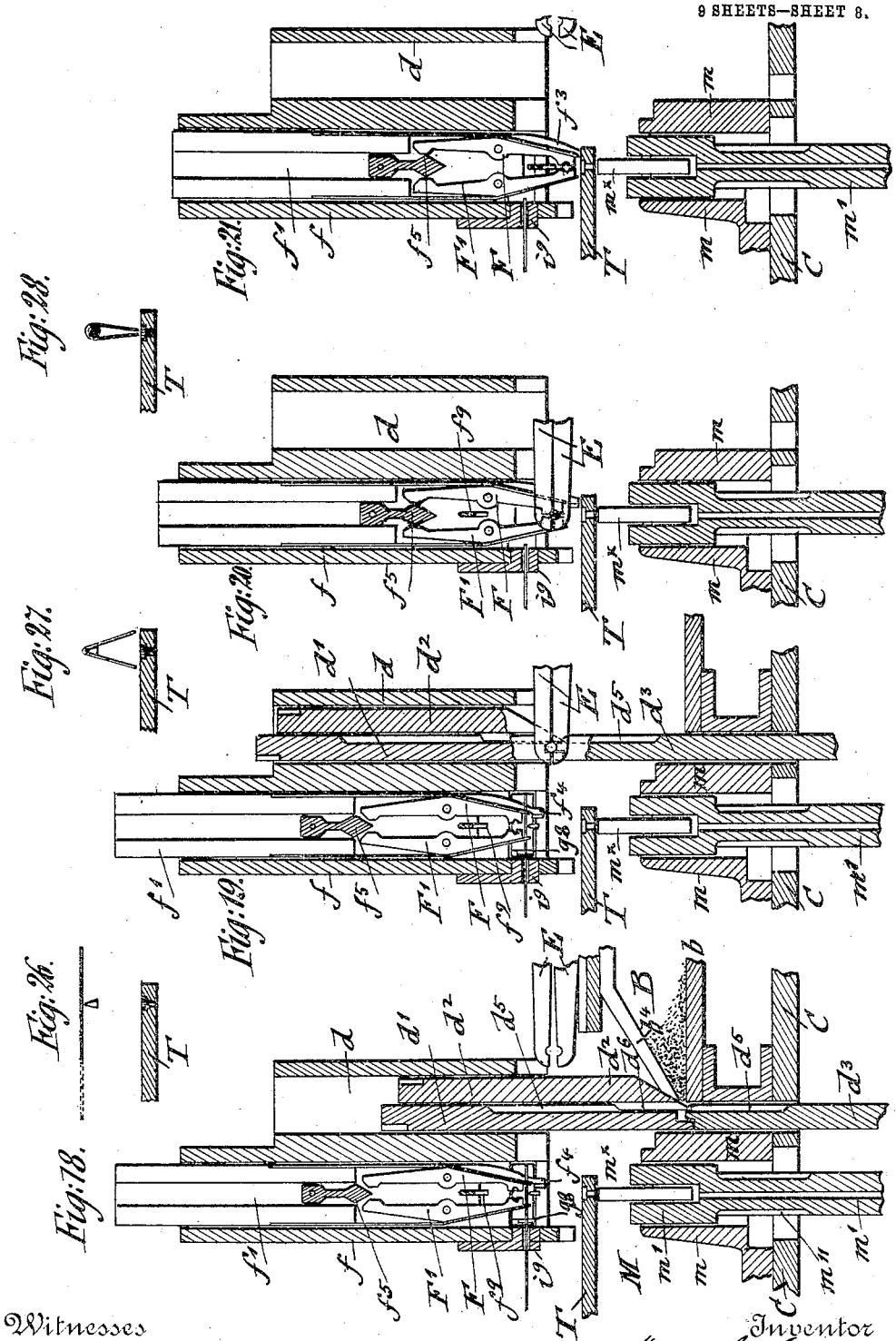

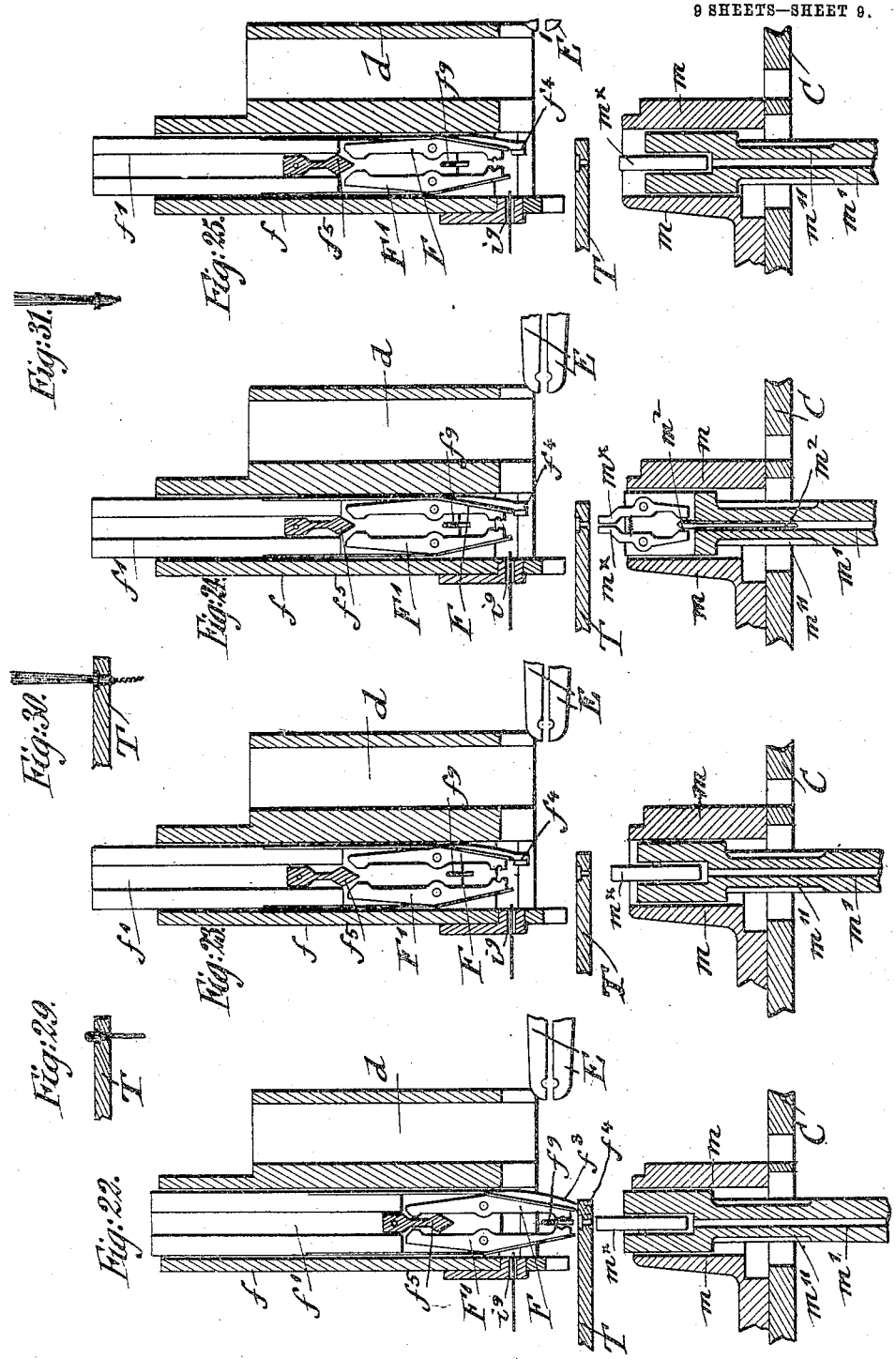

No. 792,267.

Patented June 13, 1905.

UNITED STATES PATENT OFFICE.

MARTIN G. IMBACH, OF NEW YORK, N. Y., ASSIGNOR TO CHARLES LOONEN, OF PARIS, FRANCE.

MACHINE FOR MAKING BRUSH-KNOTS.

SPECIFICATION forming part of Letters Patent No. 792,267, dated June 13, 1905.

Application filed June 14, 1904. Serial No. 212,502.

*To all whom it may concern:*

Be it known that I, MARTIN G. IMBACH, a citizen of the United States, residing in New York, borough of Brooklyn and State of New York, have invented certain new and useful Improvements in Machines for Making Brush-Knots, of which the following is a specification.

This invention relates to an improved machine for making wire-tied brush-knots—that is to say, tufts of bristles or other fibers which are bent up near the center of their length and tied together by means of wire and inserted into a ferrule, so as to be ready for use in the manufacture of toilet and other brushes; and the invention consists of a machine for making brush-knots which comprises in its general outlines an intermittently-rotating table provided with equidistant ferrule-sockets near its circumference, a bristle-feed box, a vertically-reciprocating bristle-separating device located adjacent to said bristle-feed box and adapted to take up a certain quantity of bristles from the same, horizontally-reciprocating fingers or tongs for grasping the tufts of bristles in the separator-box and transmitting them toward and above the rotary table, means for feeding a wire to a point above said tuft of bristles, a transversely-reciprocating cutter-bar provided with a cutter and a knife-edged bar, forming-fingers for bending the wire-blank on said knife-edged bar and placing it over the tuft of bristles, a ferrule-supply hopper arranged adjacent to the rotary table, means for conveying the ferrules from said hopper into the sockets of the rotary table, means for conveying the tuft of bristles downward to the rotary table and feeding the ends of the bent wire-blanks into the ferrules, a wire-twisting mechanism located below the rotary table and vertically in line with the forming-fingers for grasping and drawing down the ends of the wire-blank into the ferrules, bending the tufts of bristles into U shape in the ferrules, and twisting the ends of the wire-blanks, and means for ejecting the thus-formed brush-knots from the ferrule-sockets in the rotary table.

The invention consists, further, of motion-transmitting devices by which the different operative parts referred to are actuated at the proper time by cams on a driving-shaft, in connection with stationary fulcrum-shafts and intermediate levers; and the invention consists, lastly, of other novel features and combinations of parts, which will be fully described hereinafter and finally pointed out in the claims.

In the accompanying drawings, illustrative of one embodiment of the invention, Figure 1 represents a front elevation of my improved machine for making brush-knots. Fig. 1ª is a detail vertical section, drawn on a larger scale, through the ferrule-supply hopper. Fig. 2 is a plan view of Fig. 1. Fig. 3 is a rear elevation showing the driving cam-shaft and the transmitting crank-levers of the bristle-separating device and forming-fingers. Fig. 4 is a vertical longitudinal section on line 4 4, Fig. 2. Fig. 5 is a side elevation taken from the right-hand side of the machine. Fig. 6 is a detail of the laterally-reciprocating cutter-bar with the wire-cutter and knife-edged bar. Fig. 7 is a detail horizontal section of the locking device for the intermittently-rotating table. Fig. 8 is a vertical transverse section of the machine on line 8 8, Fig. 2, the side plate of the guide-box of the cutter-bar being removed for showing more clearly the cutter-bar. Figs. 8ª and 8ᵇ are respectively enlarged vertical and horizontal sections showing the ejector mechanism in detail. Figs. 9 and 10 are respectively a detail horizontal section on line 9 9, Fig. 8, and a vertical transverse section on line 10 10, Fig. 8, drawn on a larger scale. Fig. 11 is a vertical longitudinal section, drawn on a larger scale, of the bristle feeding and transmitting mechanisms, the bristle-separating devices, and the wire-blank cutting and bending devices. Figs. 12 and 13 are respectively a detail side and end view of the finger-bar and the wire-blank-forming fingers. Figs. 14 and 15 are respectively a side and end view of the locking-bar of the forming-fingers. Fig. 16 is a detail horizontal section through the forming-fingers on line 16 16, Fig. 12. Fig. 17 is a detail top view showing the wire-twisting fingers and the mechanism for imparting intermittent rotary motion to the same. Figs. 18, 19, 20, 21, 22, 23, 24, and 25 are detail vertical sections of the operating mechanisms for making and finishing a brush-knot, showing them in different successive positions. Figs. 26 to 30 are diagrams showing the successive stages of bending and tying the wire-blank around the bristles and forming the brush-knot, and Fig. 31 is a side view of a completed wire-tied brush-knot.

Similar letters of reference indicate corresponding parts.

Referring to the drawings, A represents the supporting-frame of my improved machine for making brush-knots.

S is the main driving-shaft, which is supported in journal-bearings of suitable brackets at the rear of the supporting-frame, parallel with the longitudinal axis of the same, said shaft receiving rotary motion by a belt-and-pulley transmission from an overhead shaft in the usual manner.

C represents a stationary bed-plate which is supported by the frame A and on which the operative parts of the machine are supported.

The machine consists, in its essential features, of a bristle-feed box B, which is arranged at the right-hand end of the bed-plate C; a bristle-separating device D, arranged adjacent to the outgoing end of the bristle-feed box; horizontally-reciprocating transmitting fingers or tongs E above the feed-box; a rotary table T, to which intermittent rotary motion is imparted, located at the opposite side of the bristle-separating device, said table being provided with equidistant ferrule-sockets near its circumference and notches for the locking mechanism in the circumference adjacent to said holes and small holes for the pins of the ejector-bar, one at each side of the socket; a wire-feeding mechanism located at the left-hand end of the bed-plate C and extending over the rotary table T; wire-forming fingers F F'; a horizontally-reciprocating cutter-bar for cutting and bending the wire, located at right angles to the bristle-transmitting fingers and wire-feed, and a wire-twisting mechanism that is located below the forming-fingers and the rotary table for grasping the ends of the bent wire blank, drawing them and the bristles into the ferrules located in the sockets of the rotary table, and then twisting the wires around the bristles for tying them together.

In addition to the different mechanisms referred to there are a number of other accessories, such as the ferrule feed device by which the ferrules are fed to the socket-holes in the rotary table; the locking mechanism for the rotary table, so that the different operations required for forming the brush-knot can be performed; the mechanism for releasing the locking device, and the ejector for the completed brush-knots and ferrules.

*The bristle-feed box.*—The bristle-box B consists of a bottom plate $b$ and two adjustable side plates $b'$. The bottom plate is supported at some distance above the bed-plate C. The side walls $b'$ are provided with slotted ears $b^2$ and headed clamping-screws $b^3$, so that their distance from each other can readily be adjusted to the length of the bristles to be made into brush-knots. The bristles are retained in the bristle-box by means of guide-rods $b^4$, which are inclined at their forward ends toward the outgoing end of the bottom plate and at such a distance from the same that the thickness of the tufts of bristles fed forward between the delivery-throat thus formed is regulated. The guide-rods $b^4$ are attached to the under side of a transverse plate $b^5$, which is supported above the bristle-feed box by upright bolts $b^6$, said bolts having nuts at their upper threaded ends above and below the plate $b^5$ for permitting the adjustment of the same. On the plate $b^5$ the bristle-transmitting fingers E are supported. In the bristle-feed box is arranged a follower $b^7$, the rod $b^\times$ of which is guided at its outer end by a guide-pulley $b^8$, supported at the end of the bottom plate $b$. The follower $b^7$ exerts a uniform pressure on the bristles by means of a weight $b^9$, that is suspended by a wire $b^{10}$, passing over a second guide-pulley to the outer end of the follower-rod, as shown in Figs. 1, 2, and 4.

*The bristle-transmitting fingers.*—On the plate $b^5$, supported above the bristle-feed box, is arranged a pair of forked horizontally-reciprocating bristle-transmitting fingers E, the lower finger of which is guided in ways of the plate $b^5$, while the upper finger is pivoted to the lower finger and acted upon at its rear end by a spring $e$, tending to close the fingers. The upper finger is connected rigidly at its pivot to a vertical pivot-arm $e^2$, which in turn is pivotally connected to a horizontal link $e^3$, the latter being also pivoted to a horizontal crank-lever $e^4$, fulcrumed at the rear part of the bed-plate. An antifriction-roller $e^5$ at the rear end of said crank-lever engages a grooved cam $e^6$ on the driving-shaft S, which cam is so shaped as to impart the required reciprocating movement to the bristle-transmitting fingers E at the proper time. A keeper $e'$ is fixed to the plate $b^5$ and bears upon the upper finger during the greater part of its movement; but said finger moves beyond said keeper at the end of its forward movement and is disengaged therefrom, so that the spring $e$ causes the closing of the fingers E upon the tuft of bristles held by the separator-bars. Owing to the peculiar shape of the cam $e^6$, the link $e^3$ pulls the pivot-arm $e^2$ into inclined position upon the return movement of the fingers E, so that the rear end of the upper finger, owing to the rigid connection between the latter and said pivot-arm, is thereby depressed and permitted to pass again beneath the keeper $e$, after which the pivot-arm $e^2$ assumes again its vertical position.

*The bristle-separating device.*—Adjacent to the delivery-throat of the bristle-feed box is arranged the bristle-separating device D, which consists of five parts—an upper guide-box $d$ for guiding the upper vertically-reciprocating separator-bar $d'$ and bristle-cut-off bar $d^2$ and a lower guide-box $d^4$ for guiding the lower separator-bar $d^3$. The separator-bars and the cut-off bar serve for separating a certain quantity of bristles from the body of bristles in the throat of the bristle-feed box and for holding this quantity in a cavity formed by the recessed and overlapping ends of the upper and lower separator-bars, said cavity being of such dimensions as to receive and hold a quantity of bristles sufficient to form a brush-knot. The recessed lower end of the upper separator-bar $d'$ laps over the recessed upper end of the lower separator-bar $d^3$, the recess in the upper bar facing the delivery-throat, while the recess in the lower bar faces in the opposite direction. The recess in the upper bar is longer than the recess in the lower bar, so that when the recessed end of the upper bar arrives in the recess of the lower bar the cavity referred to is formed adjacent to the delivery-throat of the feed-box and a tuft of bristles delivered into the cavity, as shown in Fig. 18. The cut-off bar $d^2$ is provided with a knife-edged lower end and cuts off in descending the required quantity of bristles so as to form, with the cavity formed by the recessed ends of the upper and lower separator-bars, a bristle-holding box by which the tuft of bristles can be raised up into the path of the transmitting-fingers. The upper and lower separator-bars are provided on their sides facing the bristle-feed box with longitudinal grooves $d^5$ for guiding the bristle-cut-off bar, which is provided with a longitudinal rib $d^6$, that engages with the grooves of the bars so as to hold the cut-off bar tightly on the separator-bars during their downward and upward motion in the upper and lower guide-boxes when receiving and transmitting the tufts of bristles contained in the cavity at their abutting ends. The grooves are made of sufficient length so as to permit the free vertically-reciprocating movement of the cut-off bar. In their normal position the lower separator-bar closes the outgoing end of the delivery-throat of the feed-box, so as to prevent the discharge of bristles from the same, while the upper separator-bar and cut-off bar are in the upper guide-box. As soon as the upper separator-bar has moved down on the lower separator-bar so that the cavity formed at their ends is in line with the throat of the feed-box they receive the bristles fed from the same. The cut-off bar then descends and cuts off the bristles. The three bars then move together with the bristles in their cavity in upward direction into the path of the transmitting-fingers. These fingers are provided with transverse recesses $e^\times$ in their faces for grasping the ends of the tuft of bristles held by the separator-bars. The separator-bars then recede in opposite direction into their normal positions of rest, so as to permit the transmitting-fingers to move toward the forming-fingers and over one of the ferrule-sockets in the rotary table.

The required motion is imparted to the upper separator-bar and the cut-off bar by cams $d^7 d^8$ on the driving-shaft S and crank-levers $d^9 d^{10}$, placed on a fulcrum-shaft S', supported in suitable brackets above the bed-plate, while the lower separator-bar receives its motion from an intermediate cam-lever $d^{11}$, actuated by a cam $d^{12}$ on the driving-shaft S, said cam-lever being keyed to a lower fulcrum-shaft $S^2$, so as to rock the same and to actuate a crank-arm $d^{14}$, which is keyed to said fulcrum-shaft by means of a collar $d^{15}$ and is extended forward under the supporting-table, being connected, by means of a link $d^{16}$, with the lower end of the lower separator-bar. The lower fulcrum-shaft $S^2$ is, like the upper fulcrum-shaft, supported in brackets at the rear of the bed-plate, as shown in Figs. 3 and 5. The crank-levers are provided with anti-friction-rollers at the ends engaging with the cam-grooves and connected with the separator-bars by pivot-links. The forwardly-extending arms of the crank-levers are connected by tension-springs with suitable points on the bed-plate, so that the separator-bars exert a firm hold on the bristles while being carried up and delivered to the transmitting-fingers.

*The forming-fingers and their locking-bar.*—When the transmitting-fingers E come to a stop below the forming-fingers F F', the horizontal tuft of bristles is supported vertically above one of the ferrule-sockets in the rotary table. The forming-fingers F F' are located in a guide-box $f$ adjacent to the upper guide-box $d$ of the separator-bars and fulcrumed to a finger-bar $f'$, while a finger-locking bar $f^2$ is guided sidewise of the fingers in the guide-box, as shown clearly in Fig. 9. The finger-bar $f'$ is provided back of the finger F with a downwardly-extending arm $f^3$, having a wedge-shaped end $f^4$, corresponding with the V-shaped notches in the circumference of the rotary table T. The finger-locking bar $f^2$ is provided with a wedge-shaped block $f^5$ adjacent to the finger-bar and of sufficient thickness to engage the upper tapering ends of the forming-fingers. The finger-locking bar $f^2$ is provided at its lower end with a stem or pusher $f^6$, that extends in downward direction, so as to engage the rear end of the ejector-bar when the finger-locking bar arrives at its lowermost position. The lower ends of the forming-fingers are below the end of the finger-bar and are grooved transversely across their adjacent faces, so as to form a cavity for receiving the tuft of bristles delivered by the transmitting-fingers and hold them in horizontal postion. In addition to the transverse grooves $f^7$ the fingers are provided with vertical grooves $f^8$, which cross the transverse grooves, as shown in detail in Fig. 16, for permitting the entrance of a curved arm $f^9$, attached to the lower end of the locking-bar when the forming-fingers are closed. The curved arm $f^9$ bears on the tuft of bristles and pushes the same clear of the forming-fingers after they are opened by the wedge-block $f^5$ of the locking-bar. A helical spring is interposed between the lower ends of the forming-fingers, so as to open them as soon as the wedge-block releases the upper ends of the same. The wedge-block is provided with recesses at its sides, so as to permit the upper ends of the fingers to enter into the same when their lower ends arrive near the rotary table, as shown in Fig. 22, the recessed wedge-block serving, in connection with the tension-spring between the forming-fingers, for opening and closing the same. To the outside of the lower ends of each forming-finger is applied a wire-guide plate $f^{10}$, which is in contact with the finger and extended below the lower end of the same. The upper ends of the wire-guide plates are attached to the sides of the finger-bar. The lower ends of the wire-guide plates $f^{10}$ are provided with V-shaped recesses $f^{11}$ for guiding and holding the end of the wire which is fed by the wire-feeding mechanism across the lower end of the guide-box of the finger-bar. When the curved arm $f^9$ on the lower end of the finger-locking bar enters the longitudinal grooves in the ends of the forming-fingers, it presses by its recessed lower end on the wire blank bent into V shape by the forming-fingers and holds it on the tuft of bristles during the descending motion of the same. The normal position of the finger-bar and locking-bar is above the wire, which is fed transversely into the guide-box of the finger and locking bars.

Transversely of and at right angles to the lower end of the guide-box $f$ is arranged a horizontal guide-box $g$, which is, like the guide-boxes of the separator-bars and finger-bar, supported on a yoke-shaped frame C', that is placed transversely to the bed-plate C, as shown in Figs. 8 and 10. A cutter-bar $g'$ is guided in the box $g$ and connected at its rear end by a pivot-link $g^2$ with an elbow-lever $g^3$, that is fulcrumed to a standard $g^4$ on the bed-plate C. The upper arm of the elbow-lever $g^3$ is connected by a spring-actuated rod $g^5$, pivoted thereto, with the upright standard of the yoke C', so that the spring-pressure produces the return of the cutter-bar at the proper time. The rear end of the elbow-lever $g^3$ is provided with an antifriction-roller, that moves over the exterior surface of a cam $g^7$ on the driving-shaft S, said cam being so shaped as to produce the cutting off of the wire at the proper time. The cutter-bar $g$ carries a cutting-knife $g^8$ at its left-hand side and a knife-edged bar $g^9$ at its center, as shown in Fig. 6, the latter being in vertical alinement with the axis of the finger-bar. The cutting-knife $g^8$ cuts off the wire fed across the lower end of the guide-box $f$, while the knife-edged bar $g^9$ serves for bending the wire blank cut off by the cutting-knife in connection with the descending forming-fingers. The wire is held during the cutting action of the knife firmly in the recessed lower ends of the wire-guide plates. By the descending motion of the lower ends of the forming-fingers the wire blank is bent in inverted-V shape on the knife-edged bar, as shown in Figs. 26 and 27, and transferred on the quick backward motion of the knife-bar by the forming-fingers onto the tuft of bristles at the median point of the same, the bristles being held by the jaws E. The forming-fingers F F' are then actuated by the wedge $f^5$, so as to clamp the wire blank about the tuft of bristles, the latter being firmly gripped by said forming-fingers during the operation. The finger-bar, as well as the finger-locking bar, is reciprocated by crank-levers $f^{12}$ $f^{13}$ from grooves in cams $f^{14}$ $f^{15}$ on the driving-shaft, said crank-levers being located alongside of the crank-levers of the separator-bars on the upper fulcrum-shaft S'.

*The rotary table and ferrule-feed hopper.*—On the bed-plate C is supported the rotary table T, to which intermittent rotary motion is imparted from a cam $r$ on the driving-shaft and an intermediate pawl-and-ratchet mechanism $r'$ $r^2$ $r^3$, connected with the shaft of the rotary table. (Shown in dotted lines in Fig. 2.) This mechanism moves the rotary table for a certain distance, so as to bring one of the ferrule-sockets vertically below the forming-fingers. The pawl-and-ratchet mechanism is operated and timed in such a manner that one ferrule-socket after the other near the circumference of the rotary table is moved into axial alinement with the brush-knot-forming mechanisms. Any suitable pawl-and-ratchet mechanism may be employed.

At the rear part of the rotary table is arranged a cylindrical ferrule-feed hopper H, into which a number of lead ferrules, such as are used for holding the brush-knots, are placed. The hopper H is provided with a conical bottom $h$ and an opening $h'$ in said bottom, connected with a ferrule-feed tube $h^2$, the lower of which is located above the ferrule-sockets of the table T. In the hopper H is arranged a partition-plate $h^3$, which is applied to the upper end of the center shaft $h^7$ of the hopper and provided with a number of openings $h^4$, which permit the dropping of the ferrules through the same onto the conical bottom $h$. One or more brushes $h^5$ are attached to the under side of the partition-plate and extended in downward direction, so as to terminate near the conical bottom and serve to sweep the ferrules over the conical bottom toward the discharge-opening $h'$ in the bottom of the hopper. This construction of the feed-hopper H serves for keeping up a uniform supply of ferrules to the socket-holes of the rotary table. A shaking motion is imparted to the feed-hopper for producing the gradual dropping of the ferrules from the upper part of the hopper through the perforated partition-plate onto the bottom and the feeding of the ferrules through the feed-tube into the ferrule-sockets of the rotary table. This shaking motion is imparted to the feed-hopper H by a crank-arm $h^6$, that is attached to the lower end of the center shaft $h^7$, said crank-arm being connected with a helical spring $h^8$ at its outer end and provided with a lug $h^9$, that is intermittently engaged by a spring-actuated hook $h^{10}$, pivoted to a rocking lever $h^{11}$, which is fulcrumed to the bed-plate C. The rocking lever $h^{11}$ is operated by a cam $h^{15}$ on the driving-shaft S and cam-lever $h^{13}$. (Shown in Fig. 2.) The rocking motion imparted to the lever $h^{11}$ produces the intermittent engagement of the hook $h^{10}$ with the lug $h^9$ on the crank-arm of the hopper-shaft, so as to impart an oscillating or shaking motion to the ferrule-feeding hopper, and thereby a successive supply of ferrules to the sockets in the rotary table as these sockets pass below the delivery end of the feed-tube. In place of the oscillating or shaking ferrule-feed hopper any other approved ferrule-feeding device may be used.

*The wire-feeding device.*—The wire-feed I is arranged in line with the bristle-transmitting fingers and approximately on the same level therewith. The wire is supplied from a spool $i$, that is supported on upright supports $i'$ and guided over a pulley $i^2$ at the end of the bed-plate C, and then through between a set of straightening-rollers $i^3$, through the bore of a wedge-piece $i^4$, which is supported on the lower one of two slide-plates $i^5 i^6$, that are guided in ways on the stationary guide-plate $i^7$ of the wire-feed device. The wedge-piece $i^4$ projects through longitudinal slots of the stationary guide-plate and upper slide-plate $i^6$ and engages the rear ends of fulcrumed and spring-actuated fingers $i^\times$, the front ends of which grasp the wire, so as to feed it intermittently forward. The wire passes then through a tubular sleeve $i^8$ and an eye $i^9$ on the guide-box of the forming-fingers and through the V-shaped recesses of the holding-plates below the lower ends of the forming-fingers into the path of the cutter and over the knife-edged bar, as shown in Figs. 4 and 11.

At the proper time after the wire blank is cut off by the transversely-reciprocating cutter the wire is fed forward again by the action of the lower slide-plate, said slide-plate receiving its reciprocating motion by means of a lever $i^{10}$, which is fulcrumed to the bed-plate C and which is engaged at its rear end by the circumferential cam-groove of a cam $i^{11}$ on the driving-shaft S, as shown in Fig. 2. The forward motion of the lower slide-plate $i^5$ moves the upper slide-plate $i^6$, together with the wire-holding fingers, forward and feeds the wire for the length required for the next blank. During the forward motion the forward ends of the wire-holding fingers $i^\times$ are tightly closed on the wire by the action of the wedge-piece $i^4$ on the rear ends of the fingers, so as to produce at the same time the unwinding of the wire from the spool for the required length. As soon as the wire blank is cut off the lower slide-plate, together with the wedge-piece $i^4$, is moved backward in the slots of the stationary guide-plate and upper slide-plate, so that the wire-holding fingers are opened under the tension of the spring applied to their rear ends and moved backward, with the upper guide-plate, under the action of the wedge-piece until they are engaged again by the forwardly-moving wedge-piece and applied firmly at their forward or clamping ends to the wire. By this mechanism the intermittent forward feeding of the wire as required for the cutting off of the wire blanks necessary for the wiring of each tuft of bristles is obtained.

*The wire-twisting mechanism.*—Vertically below the forming-fingers and below the ferrule-socket of the rotary table, which is then in line with the forming-fingers, is located a wire grasping and twisting mechanism M, to which vertically-reciprocating motion, as well as intermittent rotary motion on its axis, is imparted at the proper time. The fulcrumed and spring-actuated fingers $m^\times$ of the wire-twisting mechanism receive also an opening-and-closing movement at the proper time for taking hold of and releasing the ends of the wire blank placed around the tuft of bristles. The wire-twisting mechanism is guided in a guide-box $m$, which is supported on the bed-plate C adjacent the guide-box of the lower separator-bar. In the guide-box $m$ is located a tubular spindle $m'$, that is guided in a collar $m^2$, which is seated in the bed-plate adjacent to the lower end of the guide-box $m$, the upper end of which carries in its enlarged and diametrically-recessed upper part the twisting-fingers $m^\times$. The lower end of the tubular spindle $m'$ is connected by pivot-links $m^3$ with the front end of a crank-lever $m^4$, that turns loosely on the lower fulcrum-shaft $S^2$ and whose rear end is engaged by a cam $m^5$ on the driving-shaft S, as shown clearly in Fig. 8. In the bore of the tubular spindle $m'$ is guided a vertically-reciprocating lock-bar $m^6$, the lower end of which is also connected by pivot-links $m^7$ with a second crank-lever $m^8$, that receives its motion at the proper time from a cam $m^9$ on the driving-shaft S, the lower end of the tubular spindle, as well as the lower end of the lock-bar, being swiveled in crossheads between the pairs of pivot-links, by which the connection of the tubular spindle and lock-bar with their operating crank-levers is made, so as to permit both the tubular spindle and lock-bar to be rotated on their axes at the proper time. The upper end of the lock-bar $m^6$ is flattened and adapted to enter between the lower ends of the fulcrumed twisting-fingers, located in the upper end of the tubular spindle $m'$. When the lock-bar $m^6$ enters between the lower ends of the fingers, the upper ends close for grasping the ends of the wire blank projecting below the table. When the lock-bar releases the lower ends of the fingers, they are opened by the tension of the spring between their upper ends and are spread apart sufficiently to permit the ends of the wire blank that project below the rotary table to enter between the ends of the twisting-fingers. Above the collar $m^2$ is guided on the bed-plate C and a transverse recess in the base of the guide-box $m$ a transverse rack-bar $m^{10}$, which meshes with a pinion $m^{11}$, formed in the upper end of the tubular spindle, said pinion having teeth of sufficient longitudinal length to provide for the engagement with the rack-bar in whatever vertical position the tubular spindle is placed. The rack-bar $m^{10}$ is connected at its rear end with a lever $h^{11}$, that is fulcrumed to the bed-plate, the opposite end of which is connected with the front end of a looped lever $h^{13}$, that rides on the driving-shaft S, and provided with pins $h^{14}$, which are acted upon by a suitably-shaped cam $h^{15}$ on the driving-shaft S, as shown clearly in Figs. 2 and 3. The shape and position of the cam are so arranged that the proper reciprocating motion is imparted to the rack-bar for rotating the twisting-fingers at the proper time and to the required extent.

*The brush-knot-ejecting device.*—The brush-knot-ejecting device N is shown in Figs. 1 and 2 and consists of an ejector-bar $n$, which is fulcrumed to an upright bracket $n'$, attached to the bed-plate C and connected by a helical spring $n^2$ with the same. The rear end of the ejector-bar $n$ is located vertically below the pusher $f^6$ on the lock-bar of the forming-fingers, (shown in Figs. 14 and 15,) which pusher is so arranged as to pass near the circumference of the rotary table when striking the ejector-bar, as shown in Figs. $8^a$ and $8^b$. The forward end is bent at an angle to the main portion and provided with two vertically-projecting pins $n^3$, which serve to enter into two small holes $n^4$, which are arranged one at each side of the ferrule-socket in the rotary table, as shown in Figs. 2 and 4. The holes $n^4$ serve for the purpose of guiding the pins $n^3$ and permitting them to engage the lower end of the ferrule and move it, with the bristles in the same, clear out of the ferrule-socket of the rotary table, so that the brush-knot is dropped over the edge of the rotary table into a suitable receptacle placed on the bed-plate below the same. As one brush-knot after the other is ejected in this manner from the ferrule-sockets of the rotary table they are free to receive another supply of ferrules as they pass below the feed-tube of the ferrule-feed hopper.

*Operation.*—The operation of the different parts has already been described in connection with their construction, and it is therefore only necessary to describe the successive steps which are necessary for separating and transmitting a tuft of bristles, placing the wire blank around the same, feeding it into the ferrule located in one of the ferrule-sockets of the rotary table, drawing the ends of the wire blank, with the tuft of bristles, into the ferrule, so as to bend or double up the bristles, and the twisting of the wire around the bristles, so that they can be ejected, with the ferrule, as a finished brush-knot by the ejecting device. The sequence of the operations is fully illustrated in Fig. 11 and Figs. 18 to 31. Bristles of the required length are placed in the bristle-feed box in front of the follower. The pressure of the follower forces them forward toward the throat in the outgoing end of the feed-box against the lower separator-bar, which in its normal position closes the outgoing end, so as to prevent the dropping of the bristles at the outside of the delivery-throat of the feed-box. When the machine is started, a uniform pressure is exerted on the bristles by the weight at the end of the follower-rod. The wire is placed in the wire-feeding mechanism and its end inserted into the guide-box and the recessed ends of the wire-holding plates of the forming-fingers, as shown in Fig. 11. When the machine is started, the upper separator-bar is lowered so that its recessed end forms, with the recessed upper end of the lower separator-bar, a cavity which is in line with the discharge-throat of the feed-box, so as to be filled with bristles. The separator cut-off bar then descends, cuts by its lower edge the required quantity of bristles, and takes them by the simultaneous motion of the three separator-bars in upward direction into the path of the reciprocating bristle-transmitting fingers, as shown in Fig. 19. The transmitting-fingers then move forward, take their position at both sides of the separator-bars, and grasp the ends of the tuft of bristles held by the same, so that the separator-bars can be returned to their normal position until the next tuft of bristles is to be separated. The bristle-transmitting fingers are then moved forward into the position shown in Fig. 20. Simultaneously with the forward motion of the bristle-transmitting fingers the wire blank has been cut off by the cutter and bent by the forming-fingers over the transverse knife-edged bar into V shape, as shown in Figs. 26 and 27. The knife-edged bar is then quickly withdrawn by its operating mechanism, so that the V-shaped blank can be bent by the forming-fingers around the center of the tuft of bristles, as shown in Fig. 28, to be transferred downwardly into the ferrule located in the ferrule-socket of the rotary table, as shown in Fig. 29. The lower ends of the wire blank are bent by the closing of the lower ends of the forming-fingers so as to be converging toward each other, so that they pass readily through the ferrule. The tuft of bristles and wire blank are moved downward by the closed forming-fingers and by the recessed end of the curved arm on the lock-bar of the forming-fingers toward the rotary table, as shown in Fig. 22. Before the downward motion of the forming-fingers and lock-bar commences the transmitting-fingers are returned to their normal position over the feed-box, so as to be out of the way of the forming-fingers and ready for the next forward motion, as shown in Fig. 21. Simultaneously with the descending motion of the forming-fingers the wedge at the lower end of the finger-bar enters one of the notches in the circumference of the rotary table adjacent to the ferrule-socket, then vertically below the forming-fingers, so that the rotary table is firmly locked in position for permitting the wire ends to enter into the ferrule and the taking hold of the lower ends of the wire blank by the wire-twisting mechanism. The twisting-fingers grasp the projecting lower ends of the wire blank, pull it, with the bristles, down into the ferrule and below the same, so as to cause the bristles to be bent or doubled up in the ferrule. This position of the parts is shown in Figs. 23 and 30. As soon as the twisting-fingers grasp the lower converging ends of the wire blank the forming-fingers and their lock-bar are returned into their normal position in the guide-box, so as to permit the forward feeding of the wire ready for the cutting off of the next wire blank. The twisting-fingers are then rotated by their rack-and-pinion mechanism so as to twist the lower ends of the wires tightly onto the doubled-up bristles. This position is shown in Fig. 24, while Fig. 25 shows the normal position of the twisting-fingers below the rotary table ready for the next twisting action. The rotary table is then moved for the required distance by its pawl-and-ratchet mechanism, so as to bring the next socket-hole into axial line with the forming and twisting fingers and the locking-arm of the guide-bar of the forming-fingers. Simultaneously with the descent of the lock-bar of the forming-fingers the ejecting-bar is actuated by the pusher at the lower end of the lock-bar, so that the completed brush-knot is ejected, with the ferrule, from the socket of the rotary table by the pins at the forward end of the ejector-bar.

From the foregoing it will be readily perceived that most of the parts have to make several successive movements. The bristle-transmitting fingers move from their normal position into position for grasping the bristles, then forward, so as to bring them into position below the forming-fingers for placing the wire blank around the same, then back into normal position. The separator-bars are moved from their normal position first into position for receiving and separating the required quantity of bristles, then bringing them up so as to be taken up by the transmitting-fingers, and then back into their normal position. The forming-fingers receive first a downward motion, so as to bend the wire blank over the knife-edged bar, then in downward direction, so as to transmit the ends of the converging wire blank into the ferrule and the bristles into position on the upper surface of the rotary table, then back again into their normal position, the knife-edge and cutter receiving a quick transversely-reciprocating motion for producing the cutting off of the wire blank and the bending of the same on the knife-edge preparatory to the transfer of the blank and the tuft of bristles, while the lock-bar of the forming-fingers receives a downwardly-reciprocating motion independently of the forming-fingers, so as to push the wire blank and bristles in downward direction for delivering the lower ends of the wire blank to the twisting mechanism and opening the forming-fingers. The twisting-fingers receive first an upward motion for grasping the lower converging ends of the wire blank below the rotary table, then a downward motion for drawing the bristles into the ferrule and doubling them up, then a rotary motion for twisting the lower ends of the wire blank, and then a downward motion for returning into their normal position ready for the next action.

By the coöperation of the different parts described the brush-knots are completed and ready for being used in the manufacture of toilet-brushes. As soon as the tufts of bristles are set into the brushes the ferrules, which have only the function of holding the tufts in position, are removed from the same and returned to the machine for making the brush-knots, so as to be used over and over again.

Having thus described my invention, I claim as new and desire to secure by Letters Patent—

1. In a machine for making wire-tied brush-knots, the combination, with a bristle-feed box, of a bristle-separating mechanism located at the throat thereof, comprising oppositely-disposed separator-bars, a cut-off bar coöperating with said separator-bars for holding a tuft of bristles, and means for simultaneously moving said separator-bars and said cut-off bar toward a bristle-transmitting means.

2. In a machine for making wire-tied brush-knots, the combination, with a bristle-feed box, of a bristle-separating mechanism arranged in proximity to the throat thereof, comprising oppositely-disposed separator-bars having recesses in their contiguous ends, whereby a bristle-retaining recess is formed between said bars when in operative position, a cut-off bar coöperating with said separator-bars for holding a tuft of bristles in said recess, and means for moving said separator-bars and said cut-off bar toward a bristle-transmitting means.

3. In a machine for making wire-tied brush-knots, the combination, with a bristle-feed box, of a bristle-separating mechanism located at the throat thereof, comprising oppositely-disposed separator-bars having differently-sized recesses at opposite sides of the contiguous ends thereof, whereby a bristle-retaining recess is formed between said bars when in operative position, a cut-off bar coöperating with said separator-bars for holding a tuft of bristles in said recess, and means for moving said separator-bars and said cut-off bar toward a bristle-transmitting means.

4. In a machine for making wire-tied brush-knots, the combination, with the bristle-feed box, of a separating mechanism comprising reciprocating separator-bars, each provided with a guiding means, and a vertically-reciprocating cut-off bar for coöperating with said separator-bars and having means for engaging the guiding means thereof.

5. In a machine for making wire-tied brush-knots, the combination, with the bristle-feed box, of a separating mechanism, comprising reciprocating separator-bars, each provided with a guiding means disposed in the direction of its movement, and a reciprocating cut-off bar for coöperating with said separator-bars and having means for engaging the guiding means thereof.

6. In a machine for making wire-tied brush-knots, the combination, with the bristle-feed box, of a separating mechanism, consisting of a guide-box, vertically-reciprocating upper and lower separator-bars provided with longitudinal grooves, and a vertically-reciprocating cut-off bar provided with a rib for engaging the grooves of the separator-bars.

7. In a machine for making wire-tied brush-knots, the combination, with the feed-box and a bristle-separating mechanism, of transmitting-fingers movable into and out of the path of the latter, continuously-acting means for closing said transmitting-fingers, and means for rendering said closing means inoperative and holding said fingers in open position except when the same are in coöperative relation with said bristle-separating mechanism.

8. In a machine for making wire-tied brush-knots, the combination, with a bristle-feed box and a bristle-separating mechanism, of transmitting-fingers movable into and out of the path of the latter, a spring for closing said transmitting-fingers, and means for rendering said spring inoperative and for holding said fingers in open position except when the same are in coöperative relation with said bristle-separating mechanism.

9. In a machine for making wire-tied brush-knots, the combination, with a bristle-feed box, and a bristle-separating mechanism, of transmitting-fingers movable into and out of the path of the latter, a spring for closing said transmitting-fingers, and a stationary keeper bearing against one of said fingers during a part of the movement thereof and operable to render said spring inoperative and to hold said fingers in open position except when the same are in coöperative relation with said bristle-separating mechanism.

10. In a machine for making wire-tied brush-knots, the combination, with the forming-fingers, of means for feeding a wire to said forming-fingers, a transversely-reciprocating cutter-bar provided with means for cutting off the wire blank and with a knife-edge bar, means for actuating said cutter-bar so as to present said knife-edge bar to and withdraw the same from said forming-fingers, and means for actuating the latter so as to bend the wire blank on said knife-edge bar and to clamp the bent blank about the tuft of bristles.

11. In a machine for making wire-tied brush-knots, the combination, with the forming-fingers, of a wire-feeding mechanism for feeding the wire below said fingers, a reciprocating cutter-bar arranged transversely of said fingers and provided at one side with a knife for cutting off the wire blanks and with a central knife-edge bar parallel to said knife, and means for actuating said forming-fingers so as to bend the wire blank on said knife-edge and to clamp the bent blank about a tuft of bristles.

12. In a machine for making wire-tied brush-knots, the combination, with the forming-fingers, of means at the ends thereof for guiding a wire, a transversely-reciprocating cutter-bar provided with means for cutting off the wire-blank and with a knife-edge bar, and means for actuating said fingers so as to bend the wire blank into V shape on said knife-edge bar and to clamp the bent blank about a tuft of bristles.

13. In a machine for making wire-tied brush-knots, brush-knot-forming fingers having wire-guiding holding-blades extending beyond the ends thereof.

14. In a machine for making wire-tied brush-knots, brush-knot-forming fingers having holding-blades extending beyond the ends of the same and provided with wire-guiding recesses.

15. In a machine for making wire-tied brush-knots, the combination, with the forming-fingers, of means for actuating the same so as to clamp a wire blank about a tuft of bristles, and holding-blades extending beyond the lower ends of said forming-fingers, the ends of said blades being provided with wire-guiding recesses.

16. In a machine for making wire-tied brush-knots, the combination, with the fulcrumed and spring-actuated forming-fingers, means for vertically reciprocating the same, and an intermittently rotary table, having ferrule-sockets therein, of means for locking the fingers in position above one of the ferrule-sockets for feeding the tuft of bristles and wire down into a ferrule.

17. In a machine for making wire-tied brush-knots, the combination, with a bristle-transmitting means, of pivoted spring-returned forming-fingers, a reciprocating bar in proximity to said fingers and having means thereon for intermittently locking the same so as to clamp the wire blanks about the tufts of bristles delivered by the transmitting means, and an arm depending from said bar for pushing the tufts from said forming-fingers into suitable ferrule-sockets after the completion of the clamping operation.

18. The combination, in a machine such as described, of an intermittently-rotating table provided with ferrule-sockets, vertically-reciprocating forming-fingers, means for actuating said fingers so as to clamp a wire blank about a tuft of bristles, means for moving said table so that one of said ferrule-sockets is in position below the tuft, and means for pushing the wired tuft into said ferrule-socket.

19. In a machine for making wire-tied brush-knots, the combination, with an intermittently-rotating table provided with a plurality of ferrule-sockets, of vertically-reciprocating forming-fingers, means for locking said fingers in closed position so as to bend a wire blank about a tuft of bristles, and means for grasping the ends of the wire, pulling the tuft of bristles through the ferrule and then intertwisting the ends of the wire.

20. In a machine for making wire-tied brush-knots, the combination, with an intermittently-rotating table provided with a plurality of ferrule-sockets, of forming-fingers in proximity to said table, means for actuating said fingers so as to bend a wire blank about a tuft of bristles, jaws for grasping the ends of the wire and pulling the same down through the ferrule, means for clamping said jaws upon the ends of the wire blank, and means for rotating said jaws and thereby intertwisting said ends.

21. In a machine for making wire-tied brush-knots, the combination, with an intermittently-rotating table provided with ferrule-sockets near its circumference, of a wire-twisting mechanism located below said ferrule-sockets, said wire-twisting mechanism being composed of fulcrumed and spring-actuated jaws, means for locking said jaws on the ends of the wire blank, and means for rotating said jaws for twisting the ends of the wire around the tuft of bristles.

22. In a machine for making wire-tied brush-knots, the combination with a rotary table provided with ferrule-sockets, of a wire-twisting mechanism embodying wire-twisting jaws, means for moving said jaws toward and away from said table, means for locking said jaws on the ends of the wire blank, and means for actuating said jaws so as to intertwist said ends.

23. In a machine for making wire-tied brush-knots, the combination, with a rotary table provided with ferrule-sockets, of a wire-twisting mechanism arranged beneath said table and embodying wire-twisting jaws, means for moving said jaws upwardly toward said table, means for locking said jaws on the ends of the wire blank, means for moving said jaws downwardly, and means for rotating the same.

24. In a machine for making wire-tied brush-knots, the combination, with a rotary table provided with ferrule-sockets, of a wire-twisting mechanism arranged beneath said table and embodying a spindle, wire-twisting jaws rotatable with said spindle, means for clamping said jaws upon the ends of the wire blank, and means for rotating said spindle.

25. In a machine for making wire-tied brush-knots, the combination, with a rotary table provided with ferrule-sockets, of a wire-twisting mechanism embodying a spindle, means for rotating the same, jaws rotatable with said spindle but longitudinally movable independently thereof, and means for locking said jaws upon the ends of the wire blank.

26. In a machine for making wire-tied brush-knots, the combination with a rotary table provided with ferrule-sockets, of a wire-twisting mechanism embodying a spindle, a pinion thereon, a rack engaging said pinion, means for actuating said rack, jaws rotatable with said spindle, and means for locking said jaws upon the ends of the wire blank.

27. In a machine for making wire-tied brush-knots, the combination, with a rotary table provided with ferrule-sockets, of a wire-twisting mechanism adjacent the same embodying a tubular spindle, means for rotating the same, wire-twisting jaws carried at one end of said spindle, and means extending through the latter for locking said jaws on the ends of the wire blank.

28. In a machine for making wire-tied brush-knots, the combination, with an intermittently-rotating table provided with a plurality of ferrule-sockets, of a wire-twisting mechanism located in proximity to said table and consisting of a tubular spindle having wire-twisting jaws attached thereto, said jaws being independently movable in the direction of said table but locked against independent rotary movement, a pinion on said tubular member, a rack engaging said pinion, and means for intermittently actuating said rack and thereby rotating said jaws.

29. In a machine for making wire-tied brush-knots, the combination, with an intermittently-rotating table provided with equidistant ferrule-sockets near its circumference, of a ferrule-supply hopper located near the table, means for imparting a shaking motion to said supply-hopper, a perforated plate in said supply-hopper, a conical bottom for the same, and a feed-tube connected with an outlet-opening in said bottom, the lower end of the feed-tube being located over the ferrule-sockets in the table for delivering ferrules to said sockets.

30. In a machine for making wire-tied brush-knots, the combination, with an intermittently-rotating table provided with ferrule-sockets and small holes adjacent to the ferrule-sockets, of an ejecting device located below said table and provided with pins for entering the holes of the ferrule-sockets, and means for operating the ejecting device at the proper time for ejecting the finished brush-knots.

31. In a machine for making wire-tied brush-knots, the combination, with an intermittently-rotating table provided with ferrule-sockets, of an ejector-lever for ejecting the finished brush-knots from said sockets, brush-knot-forming fingers, and a bar for actuating said forming-fingers and said ejector-lever.

32. In a machine for making wire-tied brush-knots, the combination, with a rotary table provided with ferrule-sockets, of an ejector device for ejecting the finished brush-knots from said sockets, brush-knot-forming fingers, and a reciprocating bar for actuating said forming-fingers and said ejector device.

33. In a machine for making wire-tied brush-knots, the combination with a rotary table provided with ferrule-sockets, of an ejector device for ejecting the finished brush-knots from said sockets, brush-knot-forming fingers, a reciprocating bar, means on said bar for actuating said forming-fingers, and means on said bar for actuating said ejector device.

34. In a machine for making wire-tied brush-knots, the combination, with a rotary table provided with ferrule-sockets, of an ejector device for ejecting the finished brush-knots from said sockets, brush-knot-forming fingers, and a reciprocating bar having means at one side thereof for actuating said forming-fingers and means at one end thereof for actuating said ejector device.

35. In a machine for making wire-tied brush-knots, the combination, with an intermittently-rotating table provided with ferrule-sockets, of forming-fingers, a bar for actuating said forming-fingers and provided with a downwardly-extending stem, and a fulcrumed ejector-lever operable by said stem to eject the finished brush-knots from said ferrule-sockets.

In testimony that I claim the foregoing as my invention I have signed my name in presence of two subscribing witnesses.

MARTIN G. IMBACH.

Witnesses:
PAUL GOEPEL,
HENRY J. SUHRBIER.